United States Patent
Byun

(10) Patent No.: US 7,633,576 B2
(45) Date of Patent: Dec. 15, 2009

(54) LIQUID CRYSTAL DISPLAY MODULE

(75) Inventor: Sung-Uk Byun, Dac-gu (KR)

(73) Assignee: LG Display Co., Ltd., Seoul (KR)

( * ) Notice: Subject to any disclaimer, the term of this patent is extended or adjusted under 35 U.S.C. 154(b) by 278 days.

(21) Appl. No.: 10/974,992

(22) Filed: Oct. 28, 2004

(65) Prior Publication Data
US 2005/0094053 A1    May 5, 2005

(30) Foreign Application Priority Data
Oct. 30, 2003   (KR) ...................... 10-2003-0076136

(51) Int. Cl.
*G02F 1/1333* (2006.01)
(52) U.S. Cl. ...................................... 349/58
(58) Field of Classification Search ................... 349/58, 349/65
See application file for complete search history.

(56) References Cited
U.S. PATENT DOCUMENTS
2001/0002145 A1* 5/2001 Lee et al. ...................... 349/58
2002/0030771 A1* 3/2002 Kim ............................. 349/61
2002/0048152 A1* 4/2002 Kurihara et al. ............. 361/704
2006/0055839 A1* 3/2006 Hirao et al. ................... 349/58

OTHER PUBLICATIONS

Attached is a machine translation of Nishiura Akiyoshi et al, JP 2001-125073.*

\* cited by examiner

*Primary Examiner*—David Nelms
*Assistant Examiner*—Lucy P Chien
(74) *Attorney, Agent, or Firm*—Morgan Lewis & Bockius LLP

(57) ABSTRACT

A liquid crystal display module includes a backlight assembly, a liquid crystal panel on the backlight assembly, a printed circuit board under the backlight assembly, a top case covering a peripheral portion of the backlight assembly and a peripheral portion of the liquid crystal panel, a driving IC between the backlight assembly and the top case, and an insulating member between the top case and the driving IC.

18 Claims, 4 Drawing Sheets

LIQUID CRYSTAL DISPLAY MODULE

The present invention claims the benefit of Korean Patent Application No. 2003-0076136 filed in Korea on Oct. 30, 2003, which is hereby incorporated by reference.

BACKGROUND OF THE INVENTION

1. Field of the Invention

The present invention relates to a liquid crystal display (LCD) device, and more particularly, to an LCD device including a module assembly.

2. Discussion of the Related Art

In general, since flat panel display devices are thin, light weight, and have low power consumption, they are increasingly being used in portable devices. Among the various types of flat panel display devices, liquid crystal display (LCD) devices are widely used for laptop computers and desktop monitors because of their superiority in resolution, color image display, and display quality.

LCD devices use the optical anisotropy and polarization properties of liquid crystal molecules to generate a desired image. In particular, liquid crystal molecules can be aligned in a specific orientation, which can be controlled by applying an electric field across the liquid crystal molecules. Due to optical anisotropy, incident light is refracted according to the orientation of the liquid crystal molecules, thereby generating the desired image.

Specifically, an LCD device have upper and lower substrates with electrodes formed thereon and the substrates are spaced apart and facing each other with a liquid crystal material interposed therebetween. When a voltage is applied to the electrodes and generates an electric field across the liquid crystal material, an alignment direction of the liquid crystal molecules changes in accordance with the applied voltage. As a result, light transmittance through the liquid crystal material is varied and images are formed.

Most LCDs are passive devices in which images are displayed by controlling an amount of light input from an outside light source. Thus, a separate light source (i.e., backlight device) is generally employed for irradiating an LCD device. There are two types of backlight devices, an edge type and a direct type, based on an arrangement of a light source within the device. In particular, an edge type backlight device has a light source installed at a side portion of a light guiding plate, and a direct type backlight device includes a light source installed above a reflective plate.

FIG. 1 is a schematic cross-sectional view of a liquid crystal display module having an edge type backlight device according to the related art, and FIG. 2 is partially enlarged view showing an electrostatic inrush to a driving IC of the liquid crystal display module of FIG. 1. In FIG. 1, a liquid crystal display module includes a backlight assembly 10 and a liquid crystal panel 20 disposed above the backlight assembly 10. The backlight assembly 10 includes a lamp 11 at its edge, a light guide plate (not shown) next to the lamp 11, a lamp housing (not shown) surrounding the lamp 11, and a reflector (not shown) underneath the light guide plate. The backlight assembly 10 and the liquid crystal panel 20 are held together by a top case 30 and a bottom case 40. In particular, the top case 30 is coupled with the bottom case 40 to accommodate and fasten the backlight assembly 10 and the liquid crystal panel 20. In general, the top and bottom cases 30 and 40 are formed of a metallic material.

In addition, a printed circuit board (PCB) 50, a driving IC 60 and a connecting tab 70 are disposed between the backlight assembly 10 and the top and bottom cases 30 and 40. The PCB 50 is disposed underneath the backlight assembly 10, and the connecting tab 70 is disposed around the lamp 11. The connecting tab 70 is often referred to as a tape carrier package (TCP), and the driving IC 60 is formed on the connecting tab 70. In particular, the connecting tab 70 connects the PCB 50 to the driving IC 60 and connects the driving IC 60 to the liquid crystal panel 20.

However, the metallic top case 30 directly contacts the liquid crystal panel 20 without other additional connectors. As shown in FIG. 2, such a contact generates static electricity and causes electrostatic discharge (ESD) affecting the driving IC 60 or other circuitry. In particular, the static electricity flows through the metallic conductive top case 30 and then is discharged into the adjacent electric circuits, such as the driving IC 60. As a result, the electrostatic discharge (ESD) damages the driving IC 60, thereby causing malfunctions in the liquid crystal panel 20.

SUMMARY OF THE INVENTION

Accordingly, the present invention is directed to a liquid crystal display module that substantially obviates one or more of the problems due to limitations and disadvantages of the related art.

An object of the present invention is to provide a liquid crystal display module that has a structure capable of preventing static electricity.

Another object of the present invention is to provide a liquid crystal display module, which is produced at relatively low costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display module includes a backlight assembly, a liquid crystal panel on the backlight assembly, a printed circuit board under the backlight assembly, a top case covering a peripheral portion of the backlight assembly and a peripheral portion of the liquid crystal panel, a driving IC between the backlight assembly and the top case, and an insulating member between the top case and the driving IC.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used throughout the drawings to refer to the same or like parts.

Figure 1:
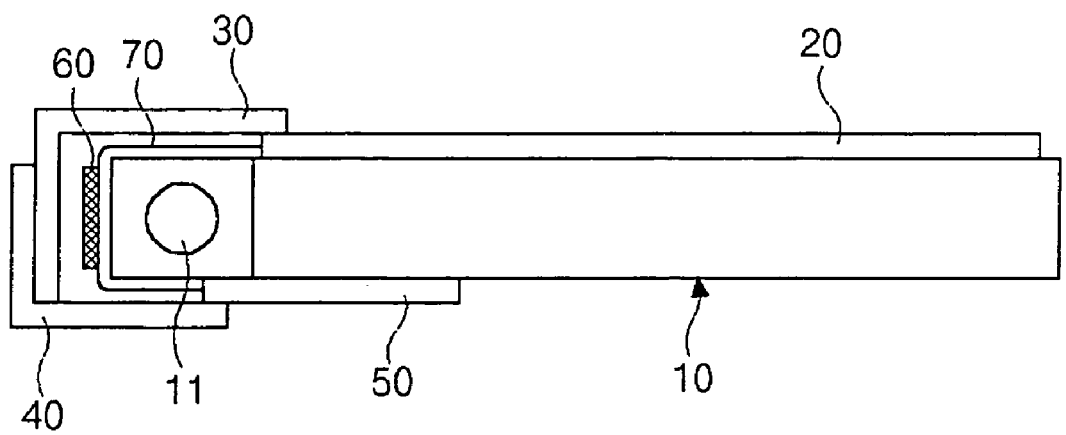
FIG. 1 is a schematic cross-sectional view of a liquid crystal display module having an edge type backlight device according to the related art.
Figure 2:
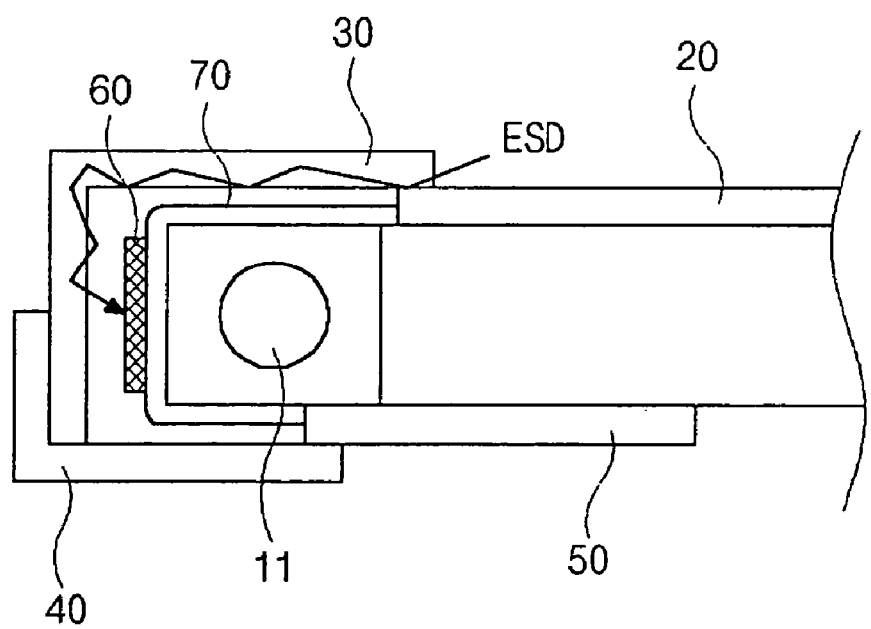
FIG. 2 is partially enlarged view showing an electrostatic inrush to a driving IC of the liquid crystal display module of FIG. 1.
Figure 3:
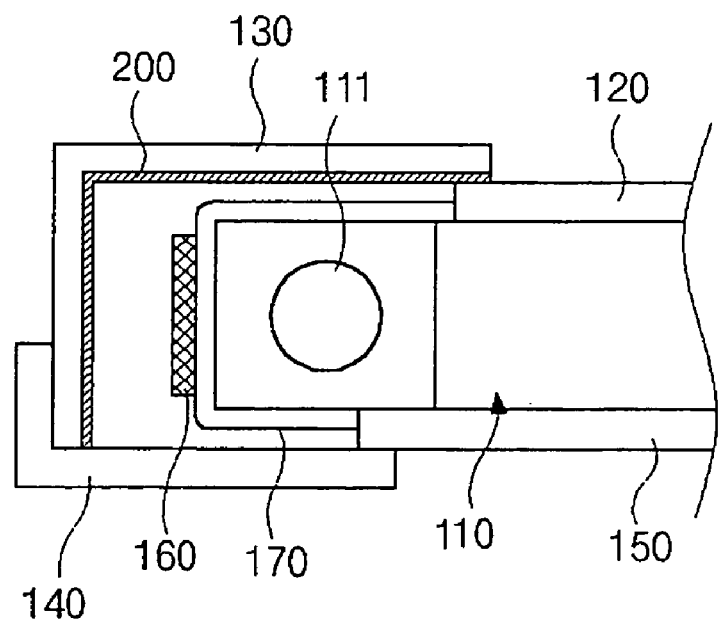
FIG. 3 is a schematic cross-sectional view of a liquid crystal display module according to an embodiment of the present invention.

FIG. 3 is a schematic cross-sectional view of a liquid crystal display module according to an embodiment of the present invention. In FIG. 3, a liquid crystal display module may include a backlight assembly 110 and a liquid crystal panel 120 disposed above the backlight assembly 110. The backlight assembly 110 may include a light source 111 at its edge. The light source 111 may include a lamp. Although not shown in FIG. 3, the backlight assembly 110 also may include a light guide plate next to the light source 111 for directing light generated from the light source 111, a lamp housing surrounding the light source 111 for holding the light source 111, a reflector underneath the light guide plate, and other optical sheets over the liquid guide plate.

The backlight assembly 110 and the liquid crystal panel 120 may be held together by a top case 130 and a bottom case 140. In particular, the top case 130 may be coupled with the bottom case 140 to accommodate and fasten the backlight assembly 110 and the liquid crystal panel 120 by embracing the peripheries of the backlight assembly 110 and the liquid crystal panel 120. In particular, only the top case 130 or both of the top and bottom cases 130 and 140 may be formed of a conductive metallic material.

In addition, a printed circuit board (PCB) 150 may be disposed underneath the backlight assembly 110 and may control a driving IC 160 through a connecting tab 170 to operate the liquid crystal panel 120. The driving IC 160 may be formed on an outer surface of the connecting tab 170, and the connecting tab 170 may be disposed around the lamp housing holding the light source 111. The connecting tab 170 may include a flexible tape carrier package (TCP) for connecting the PCB 150 to the driving IC 160 and connecting the driving IC 160 to the liquid crystal panel 120.

Further, an insulating member 200 may be formed on an inner surface of the top case 130 to guard the driving IC from static electricity. The insulating member 200 may be interposed between the liquid crystal panel 120 and the top case 130 and between the top case 130 and the driving IC 160, whereby isolating the driving IC 160 from the top case 130. As a result, electrostatic discharge accidentally generated by the top case 130 is not able to flow into the liquid crystal panel 120, the connecting tab 170, the driving IC 160 or the PCB 150, thereby preventing electrostatic damages in these circuitries and avoiding malfunctions in the liquid crystal panel 120.

Figure 4:
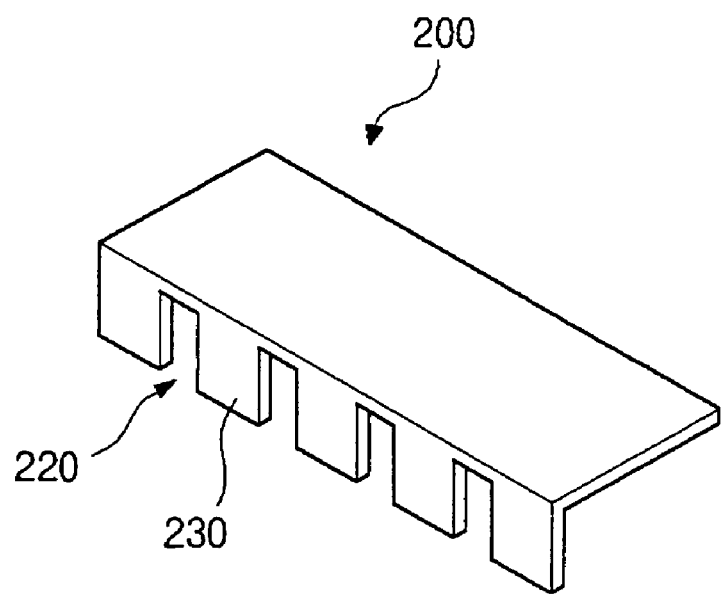
FIG. 4 is a perspective view of the insulating member of FIG. 3.

FIG. 4 is a perspective view of the insulating member of FIG. 3. As shown in FIG. 4, the insulating member 200 may have a shape like a letter "L" in its cross-section. The insulating member 200 may be formed of a rigid plastic material and may have an adhesive property for attaching onto the inner surface of the top case 130. For example, the insulating member 200 may include an insulating tape. In addition, a sidewall of the insulating member 200 may include a plurality of indentations 220 and a plurality of protrusions 230. Each of the protrusions 230 may correspond to the driving IC 160. Alternatively, the sidewall of the insulating member 200 may have no indentations and no protrusions to completely insulate the top case 130 from the driving IC 160.

Figure 5:
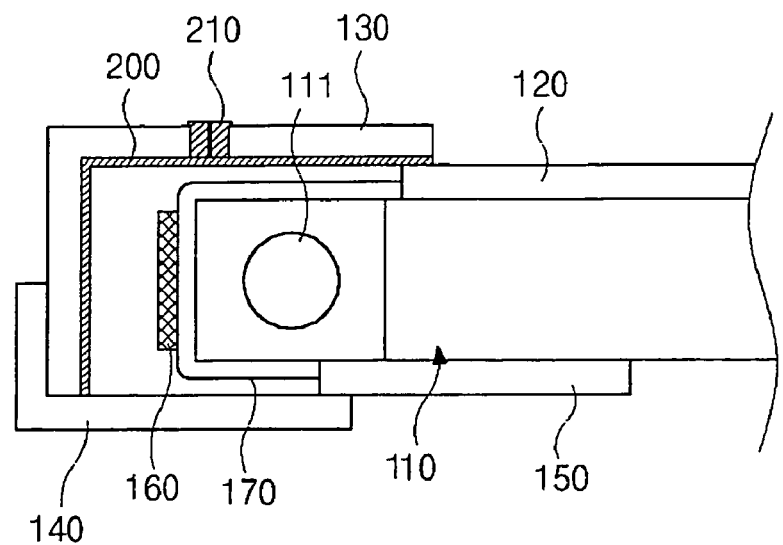
FIG. 5 is a schematic cross-sectional view of another liquid crystal display module according to an embodiment of the present invention.

FIG. 5 is a schematic cross-sectional view of another liquid crystal display module according to an embodiment of the present invention. In FIG. 5, a liquid crystal display module may include a backlight assembly 110 and a liquid crystal panel 120 disposed above the backlight assembly 110. The backlight assembly 110 may include a light source 111 at its edge. Although not shown in FIG. 5, the backlight assembly 110 also may include a housing for holding the light source 111, and a light guide plate, a reflector underneath the light guide plate, and other optical sheets over the liquid guide plate for directing light generated from the light source 111.

The backlight assembly 110 and the liquid crystal panel 120 may be held together by a top case 130 and a bottom case 140. In particular, the top case 130 may be coupled with the bottom case 140 to accommodate and fasten the backlight assembly 110 and the liquid crystal panel 120 by embracing the peripheries of the backlight assembly 110 and the liquid crystal panel 120. In particular, only the top case 130 or both of the top and bottom cases 130 and 140 may be formed of a conductive metallic material.

In addition, a printed circuit board (PCB) 150 may be disposed underneath the backlight assembly 110 and may control a driving IC 160 through a connecting tab 170 to operate the liquid crystal panel 120. The driving IC 160 may be formed on an outer surface of the connecting tab 170, and the connecting tab 170 may be disposed around the lamp housing holding the light source 111. The connecting tab 170 may include a flexible tape carrier package (TCP) for connecting the PCB 150 to the driving IC 160 and connecting the driving IC 160 to the liquid crystal panel 120.

Further, an insulating member 200 may be coupled to the top case 130 through a plurality of connectors 210 to guard the driving IC from static electricity. The insulating member 200 may be interposed between the liquid crystal panel 120 and the top case 130 and between the top case 130 and the driving IC 160, whereby isolating the driving IC 160 from the top case 130. As a result, electrostatic discharge accidentally generated by the top case 130 is not able to flow into the liquid crystal panel 120, the connecting tab 170, the driving IC 160 or the PCB 150, thereby preventing electrostatic damages in these circuitries and avoiding malfunctions in the liquid crystal panel 120.

Figure 6:
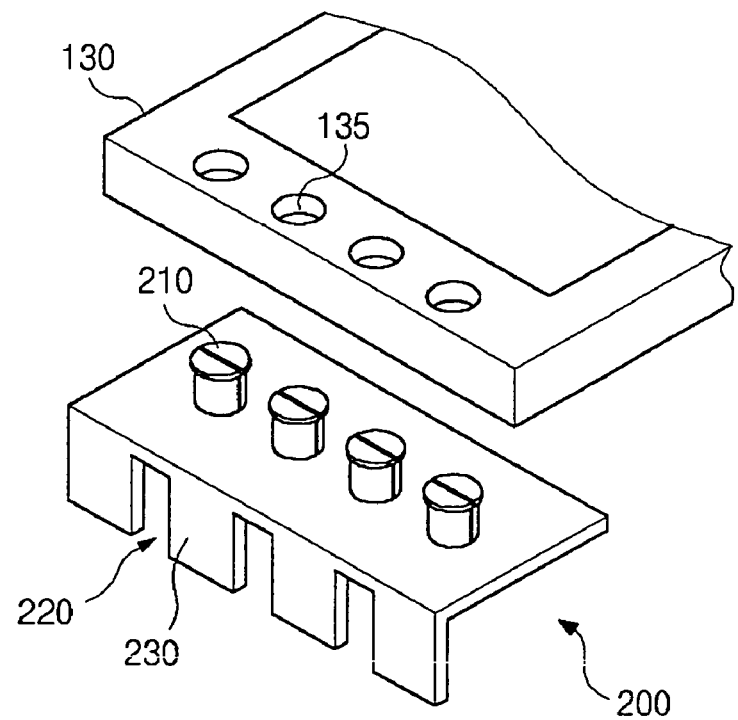
FIG. 6 is a perspective view of the insulating member and a portion of the top case of FIG. 5.

FIG. 6 is a perspective view of the insulating member and a portion of the top case of FIG. 5. As shown in FIG. 6, the insulating member 200 may have a shape like a letter "L" in its cross-section. The insulating member 200 may be formed of a rigid plastic material. In addition, a sidewall of the insulating member 200 may include a plurality of indentations 220 and a plurality of protrusions 230. Each of the protrusions 230 may correspond to the driving IC 160. Alternatively, the sidewall of the insulating member 200 may have no indentations and no protrusions to completely insulate the top case 130 from the driving IC 160.

Moreover, the insulating member 200 may receive the connectors 210 on its top wall and the top case 130 may have a plurality of connecting holes 135 corresponding to these connectors 210. As a result, the insulating member 200 may be assembled with the top case 130 by fastening the connectors 210 through the connecting holes 135 onto the top wall of the insulating member 200. Thus, the connecting member 200 does not require an adhesive property for attaching onto the inner surface of the top case 130. Also, the connectors 210 help the connecting member 200 to remain stationary even when an external impact is applied to the liquid crystal module during the fabrication process or in transit. The connectors 210 may include screws, clamps, or any means capable of securing the connecting member 200.

Figure 7:
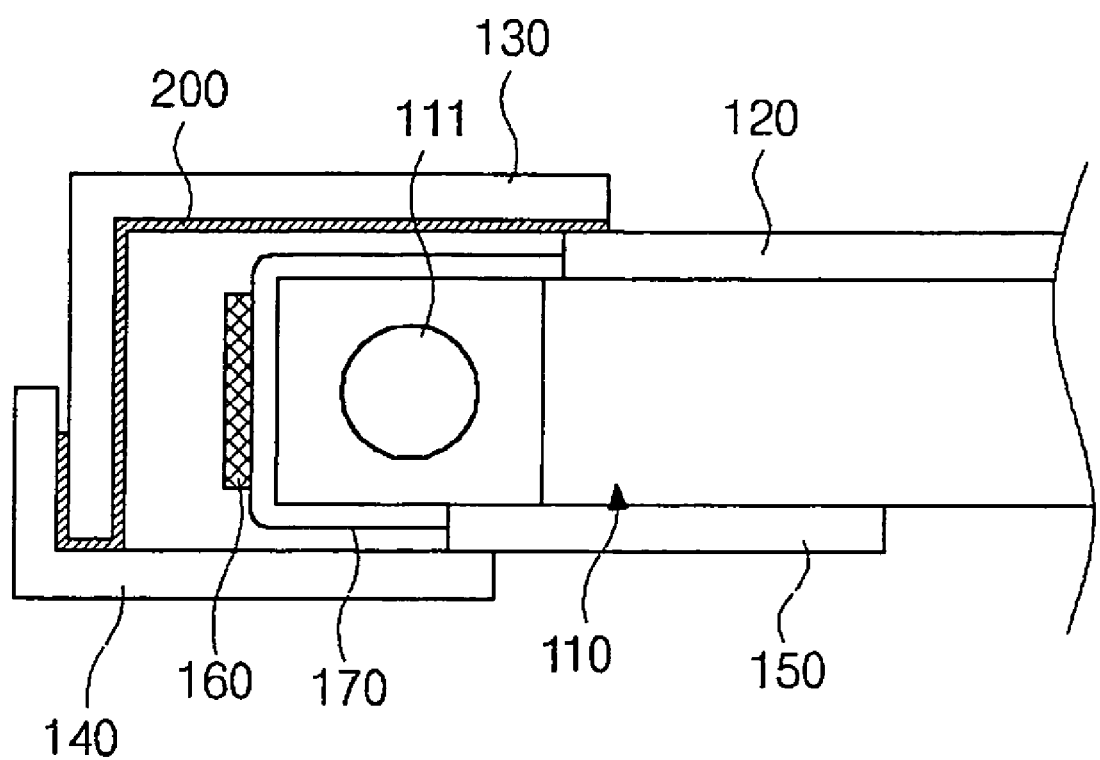
FIG. 7 is a schematic cross-sectional view of another liquid crystal display module according to an embodiment of the present invention.

FIG. 7 is a schematic cross-sectional view of another liquid crystal display module according to an embodiment of the present invention. As shown in FIG. 7, the insulating member 200 may extend to an outer surface portion of the top case 130. In particular, the extended portion of the insulating member 200 may be interposed between the top case 130 and the bottom case 140, thereby electrically isolating the bottom cover 140 from the top case 130. Especially when the bottom case 140 is formed of a conductive metallic material, electrostatic discharge may be generated from the top case 130 and discharged to the PCB 150 or other related circuitries. Thus, the extend portion of the insulating member 200 may guard the PCB 150 from static electricity. Although not shown in FIG. 7, an additional insulating member may be disposed between an inner surface of the bottom cover 140 and the PCB 150, whereby isolating the driving IC 160 and the connecting tab 170 from the bottom case 140. Additionally, the insulating member 200 may have an adhesive property or the connectors 210 as shown in FIG. 6.

The exemplary embodiments of the present invention provide the following advantages. Since the insulating member is formed on an inner surface of the top case, the electrostatic discharge can be prevented from being flowing into the driving IC and the electrostatic damages do not occur in the circuitries. Therefore, the liquid crystal display module can obtain a stable operating and have a long life span.

It will be apparent to those skilled in the art that various modifications and variations can be made in the liquid crystal display module of the present invention without departing from the spirit or scope of the invention. Thus, it is intended that the present invention covers the modifications and variations of this invention provided they come within the scope of the appended claims and their equivalents.

What is claimed is:

1. A liquid crystal display module, comprising:
a backlight assembly including a lamp along a direction;
a liquid crystal panel on the backlight assembly;
a printed circuit board under the backlight assembly;
a top case covering a peripheral portion of the backlight assembly and a peripheral portion of the liquid crystal panel;
driving ICs between the backlight assembly and the top case; and
an insulating member between the top case and the driving ICs such that the driving ICs are screened from the top case, wherein the insulating member includes a sidewall and a top wall connected to each other perpendicularly so that the insulating member has a "L"-like shape in its cross-section, a first side of the sidewall of the insulating member facing the driving ICs and a second side of the sidewall of the insulating member opposite to the first side facing the top case, wherein the sidewall includes a plurality of indentations and protrusions, wherein the plurality of indentations and protrusions alternate each other along the direction, so that an end of the sidewall of the insulating member has an indented shape and the sidewall of the insulating member has a square toothed shape, wherein one end of the top wall of the insulating member is interposed between the liquid crystal panel and the top case and contacts the liquid crystal and the top case.

2. The display module according to claim 1, further comprising a connecting tab surrounding the peripheral portion of the backlight assembly, electrically connecting the printed circuit board to the driving ICs and electrically connecting the driving ICs to the liquid crystal panel.

3. The display module according to claim 2, wherein the driving ICs are formed on an outer surface of the connecting tab along the sidewall of the backlight assembly.

4. The display module according to claim 3, wherein the insulating member is adjacent to an inner surface of the top case.

5. The display module according to claim 4, wherein the insulating member extends between the top case and the liquid crystal panel.

6. The display module according to claim 4, further comprising a bottom case being coupled with the top case to hold the backlight assembly and the liquid crystal panel.

7. The display module according to claim 6, where the insulating member extends between the top case and the bottom case.

8. The display module according to claim 1, wherein the insulating member is adjacent to an inner surface of the top case.

9. The display module according to claim 8, further comprising a bottom case being coupled with the top case to hold the backlight assembly and the liquid crystal panel.

10. The display module according to claim 9, where the insulating member extends between the top case and the bottom case.

11. The display device according to claim 1, wherein the insulating member includes a flexible sheet material.

12. The display module according to claim 11, wherein the insulating member includes an insulating tape.

13. The display module according to claim 11, wherein the insulating member has an adhesive property.

14. The display device according to claim 13, wherein the insulating member is adhered to an inner surface of the top case.

15. The display module according to claim 1, wherein the insulating member includes a plastic material.

16. The display module according to claim 1, wherein the protrusions correspond to the driving ICs.

17. The liquid crystal display module according to claim 1, further comprising a plurality of connectors, wherein the top case includes a plurality of connecting holes and the connectors are fastened on the insulating member through the connecting holes.

18. The display module according to claim 17, wherein the connectors are fastened on the top wall of the insulating member.

* * * * *